United States Patent [19]
Appel et al.

[11] 3,919,634
[45] Nov. 11, 1975

[54] CURRENT ARRANGEMENT FOR CORRECTING THE MEASURED VOLTAGE OF AN ANALOG SPEED TRANSDUCER

[75] Inventors: Horst Appel; Klaus Bohm; Gerhard Gleissner, all of Erlangen, Germany

[73] Assignee: Siemens Aktiengesellschaft, Munich, Germany

[22] Filed: May 13, 1974

[21] Appl. No.: 469,642

[30] Foreign Application Priority Data
May 16, 1973 Germany............................ 2324824

[52] U.S. Cl...................... 324/163; 318/314; 317/5
[51] Int. Cl.².......................... G01P 3/48; H02P 5/00
[58] Field of Search................... 324/161, 163, 166; 318/309, 312, 314; 317/5; 307/232; 322/20

[56] References Cited
UNITED STATES PATENTS
| | | | |
|---|---|---|---|
| 2,913,652 | 11/1959 | Greenberg et al.................. | 318/309 |
| 3,764,888 | 10/1973 | Anderson....................... | 324/161 X |
| 3,778,693 | 12/1973 | Korteling........................... | 318/314 |

FOREIGN PATENTS OR APPLICATIONS
1,068,035   10/1959   Germany............................ 324/161

*Primary Examiner*—Alfred E. Smith
*Assistant Examiner*—Rolf Hille
*Attorney, Agent, or Firm*—Kenyon & Kenyon Reilly Carr & Chapin

[57] ABSTRACT

An improved circuit arrangement for correcting the measured voltage of an analog speed transducer using a correction voltage derived from the speed proportional pulse train of a digital speed transducer in which the correction voltage is formed in an integrating control whose reference value is a speed proportional pulse train made up of pulses having a constant voltage-time area and whose actual value is the corrected measured voltage. The correction voltage is then added to the voltage output of the analog speed transducer in a summing amplifier to obtain the corrected measured voltage output.

6 Claims, 6 Drawing Figures

CURRENT ARRANGEMENT FOR CORRECTING THE MEASURED VOLTAGE OF AN ANALOG SPEED TRANSDUCER

BACKGROUND OF THE INVENTION

This invention relates to control systems in general and more particularly to an improved circuit arrangement for correcting the measured voltage of an analog speed transducer.

In analog speed control loops, the static measure differences obtainable with relatively inexpensive components generally are not better than 1% of the nominal speed. As a result, where highly accurate speed controls are required, digital control loops are commonly used. Although these can provide the required accuracy, they require much additional circuitry and are much more costly. In an analog control loop, the accuracy obtainable depends essentially on the quality of the actual or measured speed value. For example, it will depend on the output voltage of a tachometer generator which is used as the speed transducer. The accuracy of tachometer generators however, is limited by their temperature characteristics and linearity errors.

Various methods and arrangements have been developed for correcting the output of analog speed transducers such as tachometer generators. In one such system, the frequency of a digital speed transducer rigidly coupled to the tachometer generator is provided to a first counter for the duration of a predetermined measuring period. Its count is compared at the end of the measuring period with the count of a second counter which counts a reference frequency obtained from a fixed pulse generator. At the end of the measuring time, the difference between the counts is converted by a digital to analog converter into a corrected voltage which continues to be used until the next measuring period. This correction voltage is stored by an integrating circuit which holds it while a new measuring period is being carried out. Apparatus of this nature is disclosed in German Auslegeschrift 1,068,035. In this arrangement, the measured voltage of the tachometer generator is corrected only after the predetermined measuring period. This prior correction arrangement also requires an additional pulse generator to generate a reference frequency which must be accurately adjustable as a function of the speed reference value.

Thus, it can be seen that this prior art arrangement is costly and furthermore suffers a disadvantage because corrections are available only at the end of the measuring period. In view of this, the requirement for an improved circuit overcoming these difficiences is clear.

SUMMARY OF THE INVENTION

The present invention provides such a circuit arrangement. As in the prior art devices, a digital speed transducer is rigidly connected to the tachometer generator. The pulse train output of this digital speed transducer is converted into a pulse train in which the pulse repetition rate is proportional to speed, i.e., the same as that out of the digital transducer, but in which the pulses have a constant voltage time area. An integrator is provided which integrates the difference between the voltage of the pulse of constant voltage time area and the corrected measured analog voltage for the duration of the constant voltage time area pulse in one direction and then integrates the corrected measured voltage in the other direction for the time remaining before the next pulse. The output of this integrator, which is the correction voltage, is provided to a summing input where it is summed with the output of the analog speed transducer to provide the final corrected measured voltage output. As will be explained in detail below, if the analog output voltage and the digital output transducer both indicate the same speed, this integration will have a zero effect. That is, the integration in one direction and that in the other direction will cancel each other. If, however, the analog speed transducer output deviates from what it should be, a d-c error term will result in the output of the integrator which will be added to or subtracted from the output of the analog speed transducer. Thus, the output of the summing amplifier will be the proper d-c voltage with an a-c component impressed on top of it.

The correction circuit of the present invention improves the accuracy of the measured voltage of the analog speed transducer substantially since the correction is made continuously and is not controlled with respect to predetermined measuring times. If the corrected voltage is used as the actual value in an analog speed control loop, a common electronic control can be used whose accuracy is increased in the same measure as the accuracy of the measurement voltage. The speed reference voltage for use in this control can be predetermined in conventional fashion using a reference voltage without the need to form further reference quantities.

In the illustrated embodiment of the invention, a switching circuit is provided for use in forming speed proportional pulse trains having pulses with a constant length from the pulse train output of the transducer. This switching circuit connects a constant reference voltage to the control input channel of the integrating control for the constant pulse length. Thus, the switching circuit converts the signals of the digital speed transducer into pulses having a constant voltage-time area. When using a switching circuit of this nature, the quality of the correction circuit is also dependent on the accuracy of the reference voltage and on the fixed time interval or pulse length in addition to its dependence on the digital transducer. The fixed time interval can be generated using known types of delay circuits. In the disclosed embodiment, a particularly accurate time period is generated using a counter having an inhibit gate at its input with the counter driven by an accurate reference frequency. The input to the counter is controlled by a memory unit such as flipflop which is set in response to the occurance of an output pulse from the digital speed transducer and reset in accordance with a predetermined count in the counter. The output of a counter is adapted to close a switch at a first predetermined count in the counter and to open that switch when a second predetermined final count is reached. The switch which is opened and closed, switches the accurate reference voltage to the integrator. When the final count is reached, the memory flipflop and counter are also reset to ready them for the next pulse sequence.

Through a suitable choice of the starting number and final number in the counter, i.e., by counting a predetermined definite number of pulses which are highly accurate, the required fixed time interval can be easily set and adapted to the application in question. Proper selection also insures that the fixed time interval always falls within a period of the speed proportion pulse train output of the digital speed transducer. It is only necessary that the fixed time interval be made shorter than a period of the speed proportional pulse train at the maximum speed. In the described embodiment, resetting of the counter is used as the final number and thus, the counter will automatically reset to zero. Also illustrated is a highly accurate reference frequency generator in the form of a quartz oscillator which may include conventional frequency division as required.

DETAILED DESCRIPTION OF THE PREFERRED EMBODIMENT

Figure 1:
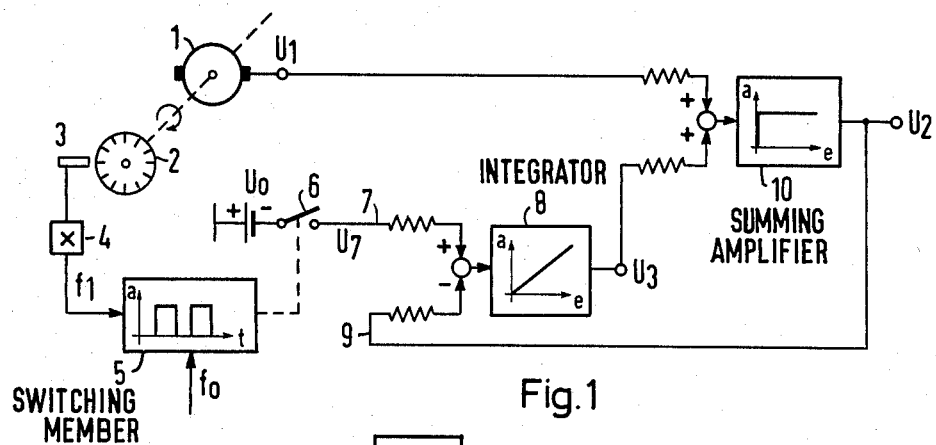
FIG. 1 is a schematic of a circuit arrangement according to the present invention.
Figure 3A:
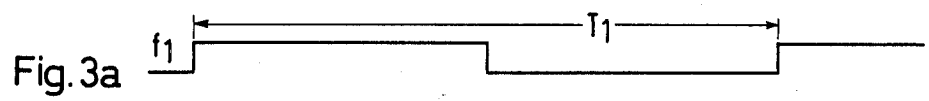
FIG. 3 is a wave-form diagram illustrating various wave-forms present in the circuits of FIGS. 1 and 2.

FIG. 1 illustrates in schematic-block diagram form the circuit arrangement of the present invention. A tachometer generator 1 provides at its output a measured voltage $U_1$ representing the speed of rotation. In typical fashion, tachometer 1 will be coupled to a motor or the like in a speed control loop. Rigidly coupled to the tachometer 1 is a digital pulse transducer for generating an output signal comprising a plurality of pulses at a frequency $f_1$ which is proportional to speed. These pulses are illustrated in FIG. 3a. The pulses have a period $T_1$ which period is inversely proportional to speed. That is, frequency is directly proportional to speed and thus, the period is inversely proportional to speed. This pulse train at frequency $f_1$ can be developed as illustrated by scanning a pulse disk 2 having magnetic segments thereon with a Hall effect generator 3. Also shown is a pulse amplifier and pulse shaper 4 for amplifying and shaping the pulses before their input to a switching member 5. The frequency $f_1$ proportional to speed along with a reference frequency $f_o$ are provided as inputs to the switching circuit 5. As will be explained in greater detail below, switching circuit 5 provides pulse train outputs at a frequency or pulse repetition rate equal to $f_1$ but with pulses of constant length. Elements within the switching circuit have as inputs the reference frequency $f_o$ and from this reference frequency develop pulses of a predetermined length which pulses are synchronized therein with the $f_1$ pulses. These pulses are then used to close a switch 6 to couple a highly accurate fixed reference voltage $U_o$ into the non-inverted input line of an integrator 8. Because the voltage $U_o$ is fixed as is the time interval, the pulse input provided and designated as $U_7$ to the input 7 of the integrator 8 will have a constant voltage-time area. Integrator 8 will comprise in conventional fashion an operational amplifier with a feedback capacitor. At the integrator 8, a second input from the output $U_2$ from summing amplifier 10 representing the corrected measured voltage is present at all times at the inverting input. Thus, while the switch is closed, the difference between the voltage $U_7$ and the voltage $U_2$ is integrated and while switch 6 is opened, the voltage $U_2$ integrates in the opposite direction. The output $U_3$ of integrator 8 is provided as one input to summing amplifier 10 where it is added to the output $U_1$ of the analog speed transducer 1 to provide the corrected output $U_2$.

Figure 3B:
Figure 3C:
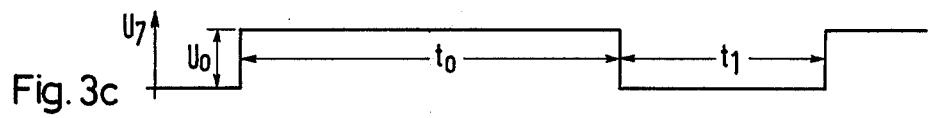
Figure 3D:
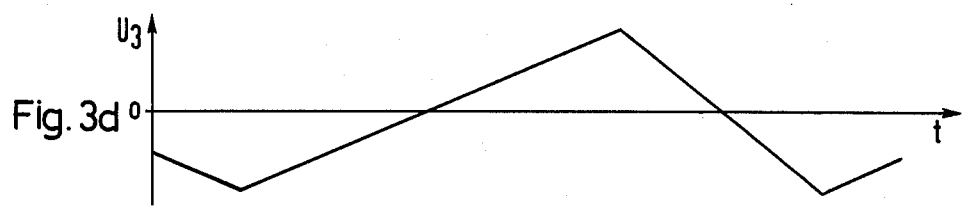

The voltage $U_7$ which appears at the one input line 7 to integrator 8 is illustrated by FIG. 3c. As shown thereon, the wave-form has a period the same as that of $f_1$. However, the pulse occuring over the time $t_o$ is a pulse having a constant voltage time area. The time $t_o$ is predetermined and remains constant as does the accurate reference voltage $U_o$. Thus, as the time $T_1$ changes with changing speed, only the time $t_1$ representing the remainder of the period changes. In other words, $T_1 = t_o + t_1$. Assume that the integrator 8 is at the negative value shown at the beginning of $t_o$. Switch 6 is closed at the beginning of a pulse of wave-form of FIG. 3c and voltage $U_o$ will now appear at the non-inverted input to the summing junction of integrator 8. At that junction, the difference between that voltage $U_o$ and the output voltage $U_2$ will be formed. In other words, the quantity $U_7 - U_2$ is formed. This quantity will be integrated for the period $t_o$. Integration will be in a positive direction and a voltage equal to $(U_7 - U_2) t_o$ will be added to the initial value at the integrator. The switch is now open and only the voltage $U_2$ is present at the summing junction of integrator 8. This voltage will be integrated for the time $t_1$. It's contribution to the integrator output will be $- U_2 t_1$. However, $t_1 = T_1 - t_o$ and thus, this can also be expressed as $-U_2 (T_1 - t_o)$. If the output $U_2$ correctly corresponds to the speed measured by the digital speed transducer comprising the disk 2 and the sensor 3, the net effect of these two integrations should be zero. Or in other words, $(U_7 - U_2) (t_o - U_2) (t_1 - t_o)$ should be equal to 0. This equation reduces to $U_7 t_o - U_2 t_1 = 0$. However, $U_2 = K_1 s$ and $T_1 = K_2/s$, where s is the speed, i.e., $U_1$ on which $U_2$ depends, is directly proportional to speed and $T_1$ is inversely proportional to speed. Thus, $U_2 T_1 = K_1 K_2$ or in other words this quantity is independent of speed. Thus, knowing the scaling of the tachometer generator 1 and the digital speed transducer made up of the disk 2 and sensor 3 it is only necessary to scale the system so that the constant value $U_7 t_o$ is equal to $U_1 T_1$ using a value of $U_1$ representing the proper value for a speed corresponding to $T_1$. Once the system is so set up, any deviation of $U_2$ from the value which it should have will result in the value of the term $U_2 t_1$ being different from the value $U_7 t_o$. When this occurs, the net effect of the two integrations will not be zero but will be a d-c value. This d-c value is then added at summing amplifier 10 to the voltage $U_1$ to bring $U_2$ to a corrected value where the two integrations will again cancel. The resulting output at the terminal $U_2$ is a d-c voltage which is a corrected analog speed value on top of which is a sawtooth wave containing harmonics with the net effect of this wave-form, i.e., the wave-form shown on FIG. 3d, being zero.

Although it is easier to think of things happening in full cycles, it should be noted that since the voltage $U_2$ is always present at the input 9 of integrator 8, any deviation from the proper value will immediately be felt at the integrator, thus correction is taking place at all times and does not depend on the completion of predetermined time periods. It should also be recognized that this arrangement has advantages over an arrangement in which the speed proportional pulse signal is directly converted into a speed proportional analog signal by forming a mean value which is then used as the actual speed value in a speed control. An arrangement of that nature requires considerable smoothing with a correspondingly large time constant and impairs the control dynamics of a fast speed control. With the correcting circuit of the present invention, this disadvantage is avoided. It is particularly important to note that the frequency response of the correcting circuit is one, the correcting circuit therefor acts like a proportional member with a gain of one should the speed change.

Figure 2:
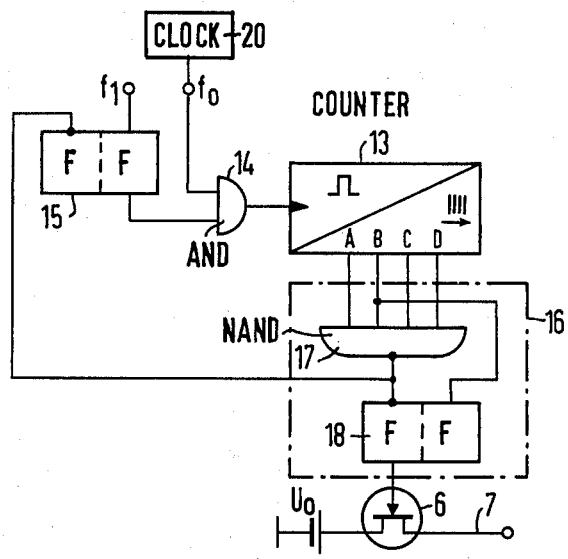
FIG. 2 is a schematic diagram of a switching circuit for use in the circuit of FIG. 1.

FIG. 2 illustrates the switching circuit 5 of FIG. 1. It includes a counter 13 having an AND gate at its input, a memory flipflop 15 used for enabling the AND gate 14 and an evaluation logic circuit 16 comprising a NAND gate 17 and flipflop 18. Also illustrated is a clock 20 for providing the reference pulse train $f_o$ shown on FIG. 3b. Preferably, clock 20 will be a highly accurate crystal oscillator with conventional dividing circuits as required. The set input to flipflop 1 is coupled to the pulse train $f_1$ obtained from the pulse amplifier and pulse shaper 4 of FIG. 1. Upon occurance of the rising edge of a pulse of the pulse train $f_1$, flipflop 15 will be set and will enable the AND gate 14. This permits the clock pulses to pass and be counted in counter 13 which as illustrated is a four stage binary counter. In order to avoid false outputs due to interference, the first two pulses are used for buffering. Thus, if fluttering occurs and the frequency $f_1$ outputs a false indication, the circuit will not respond to close the switch 6. Thus, false pulses from the digital speed transducer of a duration shorter than two reference pulse lengths will not lead to falsification of the time interval $t_o$. When the count of two is reached in counter 13, an output on line B is provided to set a flipflop 18. Flipflop 18 is coupled to the switch 6 shown as an FET switch. Thus, on the count two, the switch is closed and the reference voltage $U_o$ provided on line 7 to the summing junction of the integrator of FIG. 1. The counter 13 continues counting until a count of 16 is reached, i.e., a point where all stages of the counter will have 0 outputs. The four stages, A, B, C and D are four inputs to a NAND gate 17. A NAND gate will have a logical 1 output only when all its inputs are 0. This occurs when the count reaches 16, i.e., when the counter is reset. The output of NAND gate 17 is used to reset flipflop 18 closing the switch 6. Thus, the switch 6 is held open for 14 pulse periods. It should be noted that the size of the counter 13, the frequency $f_o$ and count at which resetting occurs may be varied according to the requirements of the system in which the present invention is employed. In any case, however, this arrangement permits providing an output pulse as shown on FIG. 3 having a very accurate length $t_o$. The output of NAND gate 17 also resets the memory flipflop 15 and disables AND gate 14 to prevent additional pulses from being counted. Flipflop 15 is then ready to start the next cycle upon occurance of a pulse on a pulse train $f_1$. The total period of the wave-form of FIG. 3c is equal to the period $T_1$ of wave-form 3a, since commencement in each case occurs in response thereto. However, the pulses of length $t_o$ remains constant; only the time $t_1$ changes as speed changes. As noted above, in selecting the length $t_o$, it is only necessary that this time not be greater than the time $T_1$ which will result for the highest possible speed of the control system.

Thus, an improved circuit arrangement for correcting the measured value of an analog speed transducer has been shown. Although specific embodiments have been illustrated and described, it will be obvious to those skilled in the art that various modifications may be made without departing from the spirit of the invention which is intended to be limited solely by the appended claims.

We claim:

1. A circuit arrangement for correcting the measured voltage of an analog speed transducer comprising:
   a. a digital speed transducer rotating with the same speed as the analog speed transducer and providing an output which is a speed proportional pulse train;
   b. means to convert said speed proportional pulse train into a pulse train having the same period as said speed proportional sequence but having pulses of constant voltage-time area;
   c. a summing amplifier having as one input the output of the analog speed transducer and providing at its output a corrected measured voltage; and
   d. an integrator having as a controlled variable input the output of said summing amplifier and as a reference input said pulse train having pulses of constant voltage-time areas, and providing its output as a second input to said summing amplifier.

2. A circuit arrangement according to claim 1 wherein said means for converting said speed proportional pulse train into a pulse train having pulses of constant voltage-time area comprises:
   a. means for developing a pulse train with the same period as said speed proportional pulse train, made up of pulses of a constant predetermined length,
   b. a reference voltage; and
   c. switching means for coupling said reference voltage to the reference input of said integrator for the length of said pulses.

3. A circuit arrangement according to claim 2 wherein said means for developing a pulse of constant length comprise:
   a. a first flipflop having its set input coupled to the output of said digital speed transducer;
   b. a clock providing a highly accurate output frequency $f_o$;
   c. an AND gate having as inputs the output of said first flipflop and the output of said clock;
   d. a counter having as an input the output of said AND gate; and
   e. means for evaluation having as inputs the outputs of predetermined stages of said counter, said means for evaluation responsive to a first predetermined count to close said switch coupling said reference voltage and to a second predetermined count to open said switch, said means further adapted to reset said first flipflop and said counter upon opening of said switch.

4. A circuit arrangement according to claim 3 wherein said second predetermined number is equal to the highest possible count of said counter whereby upon reaching said count, said counter will be automatically reset.

5. A circuit arrangement according to claim 4 wherein said means for evaluation comprise:
   a. a NAND gate having as inputs the outputs of each stage of said counter; and
   b. a second flipflop having its set input coupled to one of the outputs of said counter corresponding to said first predetermined count and having its reset input coupled to the output of said NAND gate, the output of said flipflop being coupled to said switch, and the output of said NAND gate further being coupled to reset said first flipflop.

6. A circuit arrangement according to claim 5 wherein said switch is a FET switch.

\* \* \* \* \*